(12) United States Patent
Matsumura

(10) Patent No.: US 12,717,307 B2
(45) Date of Patent: Aug. 25, 2026

(54) NUMERICAL CONTROLLER

(71) Applicant: Fanuc Corporation, Minamitsuru-gun (JP)

(72) Inventor: Hiroshi Matsumura, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 230 days.

(21) Appl. No.: 18/280,324

(22) PCT Filed: Mar. 24, 2022

(86) PCT No.: PCT/JP2022/014163

§ 371 (c)(1),
(2) Date: Sep. 5, 2023

(87) PCT Pub. No.: WO2022/210302

PCT Pub. Date: Oct. 6, 2022

(65) Prior Publication Data

US 2024/0069529 A1 Feb. 29, 2024

(30) Foreign Application Priority Data

Mar. 30, 2021 (JP) ................................. 2021-056456

(51) Int. Cl.
*G05B 19/416* (2006.01)

(52) U.S. Cl.
CPC ................................ *G05B 19/4163* (2013.01)

(58) Field of Classification Search
CPC ...... G05B 19/4163; G05B 2219/45044; G05B 19/416; B23Q 15/007; B23B 1/00
See application file for complete search history.

(56) References Cited

U.S. PATENT DOCUMENTS 4,723,219 A 2/1988 Beyer et al.
4,779,204 A 10/1988 Kanematsu et al.
(Continued)

FOREIGN PATENT DOCUMENTS

JP 05146944 A 6/1993
JP 2000105606 A 4/2000
(Continued)

OTHER PUBLICATIONS

International Search Report and Written Opinion for International Application No. PCT/JP2022/014163, dated May 24, 2022, 7 pages.
(Continued)

*Primary Examiner* — Chad G Erdman
(74) *Attorney, Agent, or Firm* — BUCHANAN INGERSOLL & ROONEY PC

(57) ABSTRACT

A numerical controller includes a cutting position calculation unit configured to calculate a plurality of cutting positions during execution of a canned cycle based on code for designating a cutting depth included in the canned cycle command, a control information calculation unit configured to calculate a plurality of pieces of control information corresponding to the plurality of cutting positions calculated by the cutting position calculation unit, respectively, and a selection unit configured to select one cutting position from the plurality of cutting positions based on the plurality of pieces of control information calculated by the control information calculation unit.

7 Claims, 6 Drawing Sheets

(56) References Cited

U.S. PATENT DOCUMENTS

| | | | | |
|---|---|---|---|---|
| 10,095,223 | B2 * | 10/2018 | Oonishi | G05B 19/416 |
| 2016/0274560 | A1 | 9/2016 | Nakajima | |
| 2017/0269576 | A1 | 9/2017 | Oonishi | |
| 2018/0299859 | A1 * | 10/2018 | Kaneko | G05B 19/41 |
| 2023/0176547 | A1 | 6/2023 | Oonishi | |

FOREIGN PATENT DOCUMENTS

| | | | |
|---|---|---|---|
| JP | 2009142915 | A | 7/2009 |
| JP | 2016177493 | A | 10/2016 |
| JP | 2017173896 | A | 9/2017 |
| JP | 2019-042867 | A | 3/2019 |
| KR | 20190068858 | A | 6/2019 |
| WO | 2021235374 | A | 11/2021 |

OTHER PUBLICATIONS

Office Action (The First Office Action) issued Mar. 13, 2026, by the State Intellectual Property Office of People's Republic of China in corresponding Chinese Patent Application No. 202280023627.1 and an English translation of the Office Action. (15 pages).

* cited by examiner

```
N1   G99 G96 S50;
N2   G00 X100.0 Z0.0;
N3   G71 U20.0 R5.0;
N4   G71 P100 Q200;
N100   G00 X50.0 Z0.0;
N101   G01 Z-80.0 F0.2;
N200   X100.0;
```

FIG.4A
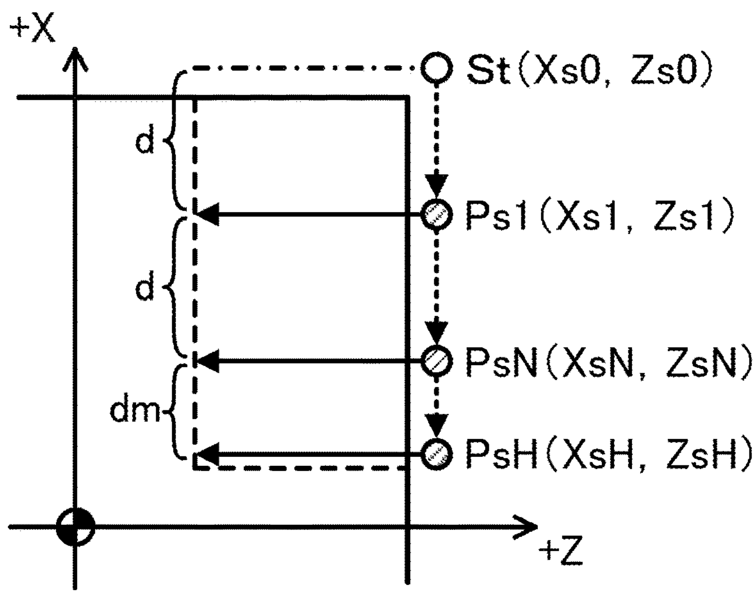
FIG.4B
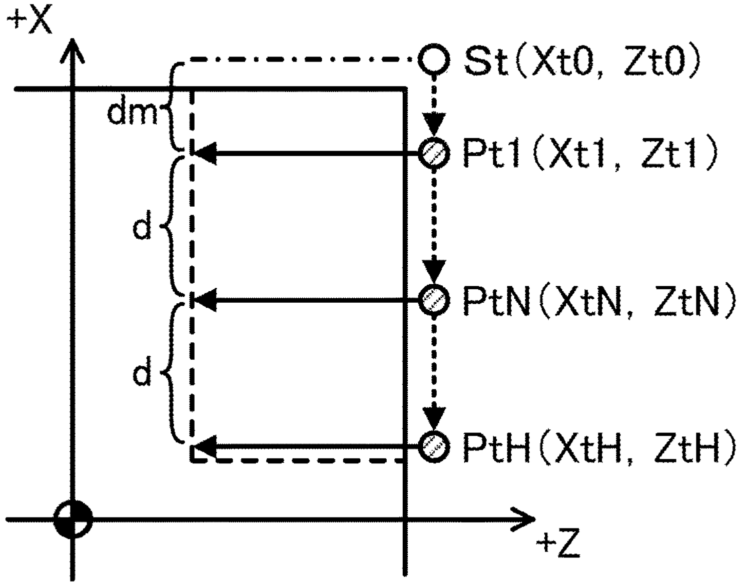
FIG.5A
```
FIRST
G00  X80.0 Z0.0
G01  Z-80.0 F0.2
G01  X85.0 Z-75.0
G00  Z0.0
G00  X80.0
```

```
SECOND
G00  X60.0 Z0.0
G01  Z-80.0 F0.2
G01  X65.0 Z-75.0
G00  Z0.0
G00  X60.0
```

```
THIRD
G00  X50.0 Z0.0
G01  Z-80.0 F0.2
G01  X55.0 Z-75.0
G00  X100.0
G00  Z0.0
```

FIG.8
```
N1  G99 G96 S50;
N2  G00 X20.0 Z0.0;
N3  G71 U20.0 R5.0;
N4  G71 P100 Q200;
N100  G00 X70 Z0.0;
N101  G01 Z-80.0 F0.2;
N200  X20.0;
```
FIG.9
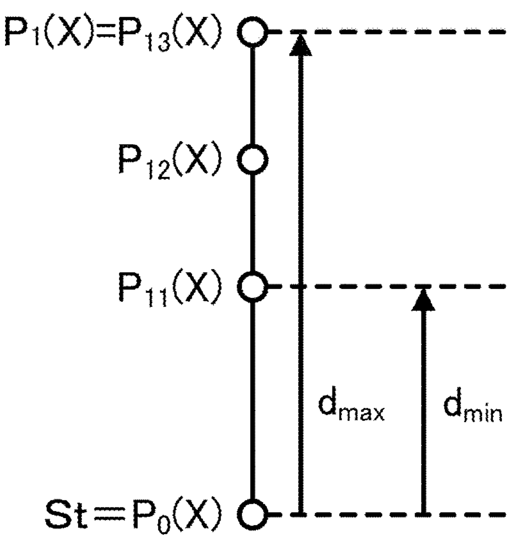
FIG.10
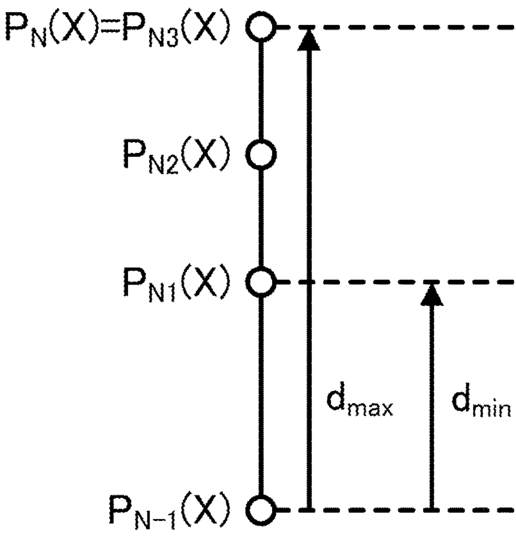

NUMERICAL CONTROLLER

CROSS REFERENCE TO RELATED APPLICATIONS

This is the U.S. National Phase application of PCT/JP2022/014163, filed Mar. 24, 2022, which claims priority to Japanese Patent Application No. 2021-056456, filed Mar. 30, 2021, the disclosures of each of these applications being incorporated herein by reference in their entireties for all purposes.

FIELD OF THE INVENTION

The present disclosure relates to a numerical controller for controlling a machine tool.

BACKGROUND OF THE INVENTION

Conventionally, in a numerical controller, a canned cycle has been used to automatically generate a movement path of a tool (see Patent Document 1). For example, in a canned cycle for roughing turning, a plurality of tool paths during roughing is automatically generated by designating coordinate values of a start point of the canned cycle, coordinate values that indicate a finish shape of a workpiece, and a cutting depth. For this reason, a machining program can be simplified, and a load of creating the machining program can be reduced.

PATENT DOCUMENT

Patent Document 1: JP 2016-177493 A

SUMMARY OF THE INVENTION

In general, a tool path designated by a machining program is determined in consideration of shortening a machining time of a workpiece. However, in a canned cycle, the tool path is automatically generated, and thus the machining time cannot be shortened during execution of the canned cycle. Therefore, it is desired to shorten the machining time during execution of the canned cycle.

An object of the disclosure is to provide a numerical controller capable of shorting an execution time of a machining program including a canned cycle.

A numerical controller includes a cutting position calculation unit configured to calculate a plurality of cutting positions during execution of a canned cycle based on code for designating a cutting depth included in a canned cycle command, a control information calculation unit configured to calculate a plurality of pieces of control information corresponding to the plurality of cutting positions calculated by the cutting position calculation unit, respectively, and a selection unit configured to select one cutting position from the plurality of cutting positions based on the plurality of pieces of control information calculated by the control information calculation unit.

According to the disclosure, it is possible to shorten an execution time of a machining program including a canned cycle.

BRIEF DESCRIPTION OF DRAWINGS

FIG. 4A is a diagram for describing an example of candidates for a cutting position calculated by a cutting position calculation unit;

FIG. 4B is a diagram for describing an example of candidates for a cutting position calculated by the cutting position calculation unit;

FIG. 5A is a diagram for describing a control command generated by a command generation unit;

FIG. 8 is a diagram illustrating an example of a machining program used for inner diameter turning;

FIG. 9 is a diagram for describing a first cutting operation in a canned cycle; and FIG. 10 is a diagram for describing an Nth cutting operation in the canned cycle.

DETAILED DESCRIPTION OF EMBODIMENTS OF THE INVENTION

An embodiment of the disclosure will be described below with reference to the drawings. Note that not all combinations of features described in the following embodiment are necessarily required to solve the problem. Further, more detailed description than necessary may be omitted. In addition, the following description of the embodiment and drawings are provided for those skilled in the art to fully understand the disclosure, and are not intended to limit the scope of the claims.

Figure 1:
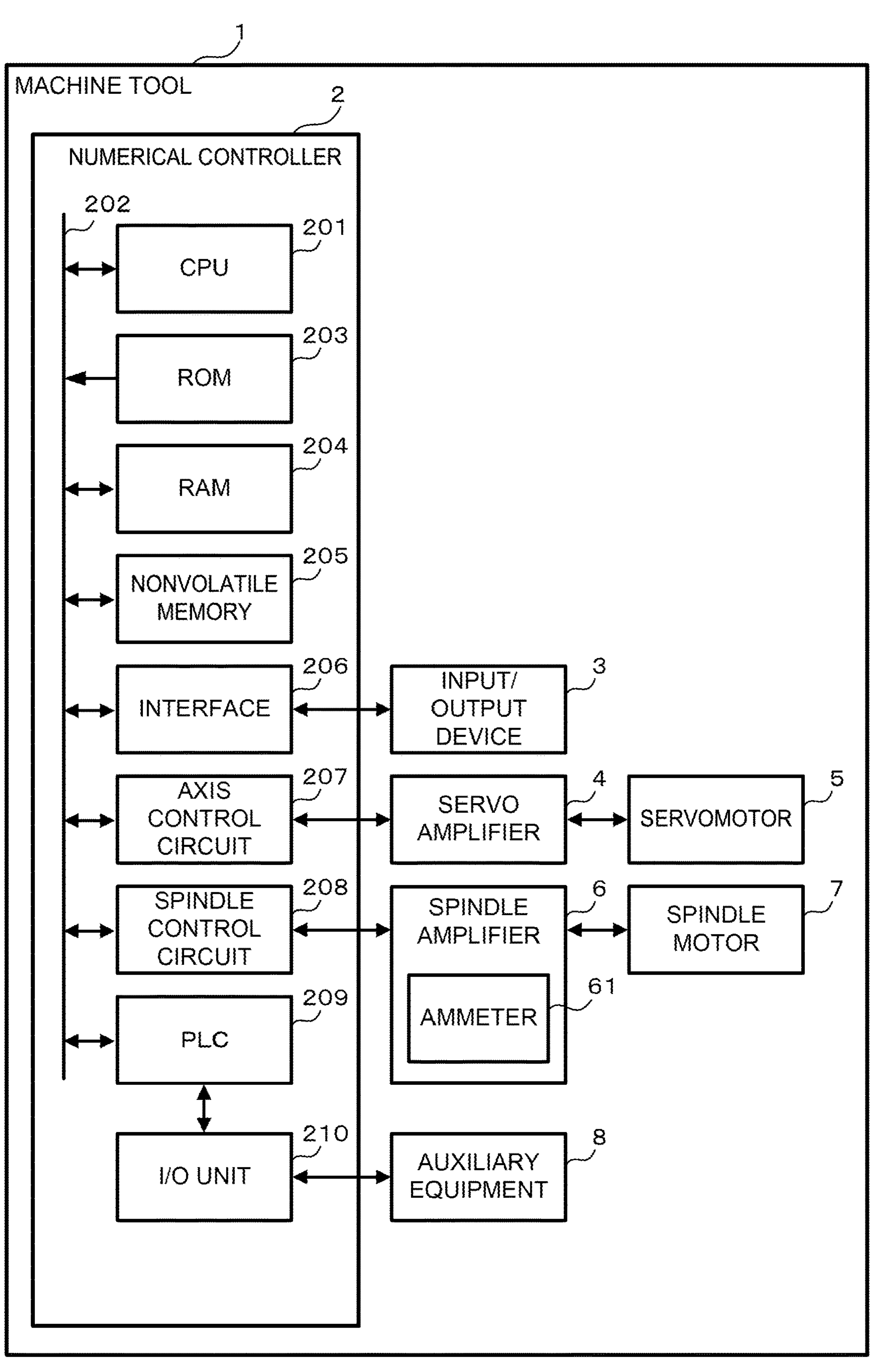
FIG. 1 is a diagram illustrating an example of a hardware configuration of a machine tool.

FIG. 1 is a diagram illustrating an example of a hardware configuration of a machine tool. A machine tool 1 is, for example, a lathe and a multitasking machine.

The machine tool 1 includes, for example, a numerical controller 2, an input/output device 3, a servo amplifier 4 and a servomotor 5, a spindle amplifier 6 and a spindle motor 7, and auxiliary equipment 8.

The numerical controller 2 is a device that controls the entire machine tool 1. The numerical controller 2 includes a CPU (Central Processing Unit) 201, a bus 202, a ROM (Read Only Memory) 203, a RAM (Random Access Memory) 204, and a nonvolatile memory 205.

The CPU 201 is a processor that controls the entire numerical controller 2 according to a system program. The CPU 201 reads a system program, etc. stored in the ROM 203 via the bus 202. In addition, the CPU 201 controls the servomotor 5 and the spindle motor 7 based on a machining program.

For example, the CPU 201 decodes a machining program and outputs a control command to the servomotor 5 for each control cycle.

The bus 202 is a communication path that connects respective pieces of hardware in the numerical controller 2 to each other. Respective pieces of hardware in the numerical controller 2 exchanges data via the bus 202.

The ROM 203 is a storage device that stores a system program, etc. for controlling the entire numerical controller 2. The ROM 203 is a computer-readable storage medium.

The RAM 204 is a storage device that temporarily stores various data. The RAM 204 functions as a work area for the CPU 201 to process various data.

The nonvolatile memory 205 is a storage device that retains data even when the power of the machine tool 1 is turned off and power is not supplied to the numerical controller 2. The nonvolatile memory 205 stores, for example, a machining program and various parameters input from the input/output device 3. The nonvolatile memory 205 is a computer-readable storage medium. The nonvolatile memory 205 includes, for example, an SSD (Solid State Drive).

The numerical controller 2 further includes an interface 206, an axis control circuit 207, a spindle control circuit 208, a PLC (Programmable Logic Controller) 209, and an I/O unit 210.

The interface 206 connects the bus 202 and the input/output device 3 to each other. For example, the interface 206 transmits various data processed by the CPU 201 to the input/output device 3.

The input/output device 3 is a device that receives various data via the interface 206 and displays the various data. In addition, the input/output device 3 receives input of various data and transmits the various data to the CPU 201 via the interface 206. The input/output device 3 includes a display such as an LCD (Liquid Crystal Display), a keyboard, a mouse, etc. The input/output device 3 may be a touch panel.

The axis control circuit 207 is a circuit that controls the servomotor 5. The axis control circuit 207 receives a control command from the CPU 201 and outputs a command for driving the servomotor 5 to the servo amplifier 4. For example, the axis control circuit 207 transmits a torque command for controlling the torque of the servomotor 5 to the servo amplifier 4.

The servo amplifier 4 receives a command from the axis control circuit 207 and supplies current to the servomotor 5.

The servomotor 5 is driven by being supplied with current from the servo amplifier 4. The servomotor 5 is connected to, for example, a ball screw that drives a tool post. By driving the servomotor 5, structures of the machine tool 1 such as the tool post move, for example, in an X-axis direction, a Y-axis direction, or a Z-axis direction. Note that the servomotor 5 may incorporate a speed detector (not illustrated) for detecting a feed rate of each axis.

The spindle control circuit 208 is a circuit for controlling the spindle motor 7. The spindle control circuit 208 receives a control command from the CPU 201 and outputs a command for driving the spindle motor 7 to the spindle amplifier 6. The spindle control circuit 208, for example, transmits a torque command for controlling the torque of the spindle motor 7 to the spindle amplifier 6.

The spindle amplifier 6 receives a command from the spindle control circuit 208 and supplies current to the spindle motor 7. The spindle amplifier 6 incorporates an ammeter 61 that measures a current value of the current supplied to the spindle motor 7.

The ammeter 61 detects the current value of the current supplied to spindle motor 7. The ammeter 61 transmits data indicating the detected current value to the CPU 201.

The spindle motor 7 is driven by being supplied with current from the spindle amplifier 6. The spindle motor 7 is coupled to a spindle to rotate the spindle.

The PLC 209 is a device that executes a ladder program to control the auxiliary equipment 8. The PLC 209 transmits a command to the auxiliary equipment 8 via the I/O unit 210.

The I/O unit 210 is an interface that connects the PLC 209 and the auxiliary equipment 8 to each other. The I/O unit 210 transmits a command received from the PLC 209 to the auxiliary equipment 8.

The auxiliary equipment 8 is a device installed in the machine tool 1 to perform an auxiliary operation in the machine tool 1. The auxiliary equipment 8 may be a device installed around the machine tool 1. The auxiliary equipment 8 operates based on a command received from the I/O unit 210. The auxiliary equipment 8 is, for example, a tool changer, a cutting fluid injection device, or an opening/closing door driving device.

Next, an example of functions of the numerical controller 2 will be described. The numerical controller 2 controls each unit of the machine tool 1 based on a machining program. In this way, a workpiece is machined. When a canned cycle command is designated in the machining program, the numerical controller 2 determines a tool path during execution of a canned cycle so that an execution time in the canned cycle is shortened. In other words, the numerical controller 2 determines a cutting position during execution of the canned cycle so that an execution time in the canned cycle is shortened.

Figures 2, 3:
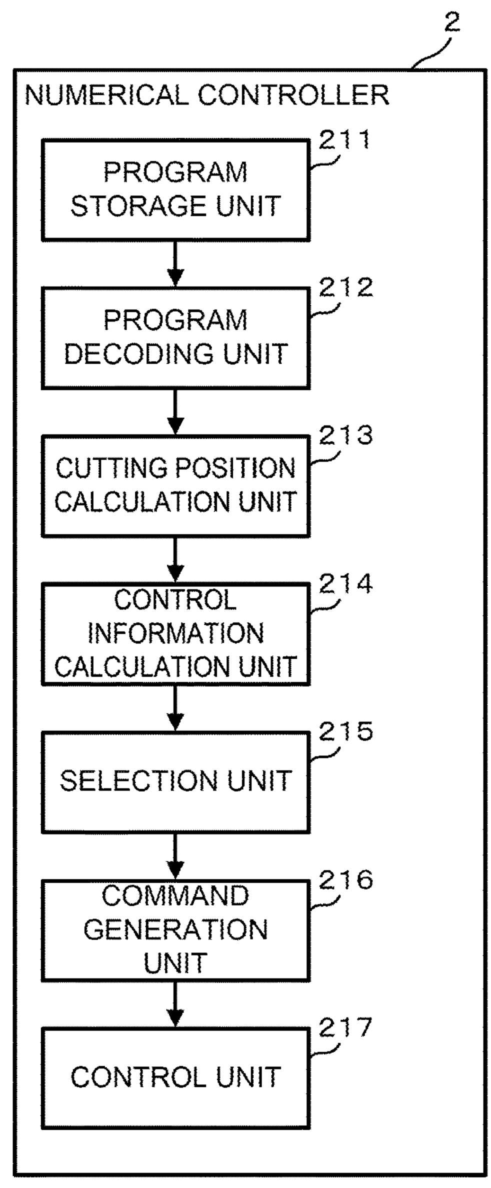
FIG. 2 is a block diagram illustrating an example of functions of a numerical controller.
FIG. 3 is a diagram illustrating an example of a machining program for turning.

FIG. 2 is a block diagram illustrating the example of the functions of the numerical controller 2. The numerical controller 2 includes a program storage unit 211, a program decoding unit 212, a cutting position calculation unit 213, a control information calculation unit 214, a selection unit 215, a command generation unit 216, and a control unit 217.

The program storage unit 211 is realized by a machining program input from the input/output device 3, etc. being stored in the RAM 204 or the nonvolatile memory 205.

For example, the program decoding unit 212, the cutting position calculation unit 213, the control information calculation unit 214, the selection unit 215, the command generation unit 216, and the control unit 217 are realized by the CPU 201 performing arithmetic processing using a system program stored in the ROM 203 and various data stored in the nonvolatile memory 205.

The program storage unit 211 stores a machining program. The machining program is a program for operating each unit of the machine tool 1 to machine a workpiece. In the machining program, a movement path of a tool, a rotational speed of the spindle, a feed rate, a cutting depth, etc. are designated using G code, S code, F code, etc.

The program decoding unit 212 reads the machining program stored in the program storage unit 211, and decodes the machining program. The program decoding unit 212 decodes G code, S code, and F code included in the machining program, as well as coordinate values designating a finish shape of the workpiece.

FIG. 3 is a diagram illustrating an example of a machining program for turning. "G99G96S50" is described in a line of sequence number N1. "G99" is code for designating feed per rotation control. "G96" is code for designating constant surface speed control. "S50" is code for designating a surface speed.

"G00X100.0Z0.0" is described in a line of sequence number N2. "G00" is code for commanding positioning. "X100.0" and "Z0.0" are, for example, coordinate values in a workpiece coordinate system. In addition, the coordinate values are coordinate values of a start point of a canned cycle.

"G71U20.0R5.0" is described in a line of sequence number N3. "G71" is code for designating a canned cycle for roughing. "U" is code for designating a cutting depth as a radius value. "R" is code for designating the amount of retract.

"G71P100Q200" is described in a line of sequence number N4. "P" is code for designating a first sequence number at which a finish shape is defined in a canned cycle. "Q" is code for designating a last sequence number at which the finish shape is defined. That is, the finish shape of the workpiece is designated in lines from sequence number N100 to sequence number N200.

"G00X50.0Z0.0" is described in a line of sequence number N100. "G01Z-80.0F0.2" is described in a line of sequence number N101. In addition, "X100.0" is described in a line of the sequence number N200. That is, in these lines, the finish shape of the workpiece is designated as a shape formed by connecting coordinates (50.0, 0.0), (50.0, −80.0), and (100.0, −80.0) in order. "F" is code for designating the amount of feed in feed per rotation control.

The cutting position calculation unit 213 calculates a plurality of cutting positions during execution of a canned cycle based on code for specifying a cutting depth included in the canned cycle command. The cutting position calculation unit 213 calculates, for example, a plurality of candidates for a cutting position in a first cutting operation in a canned cycle. As will be described later, the selection unit 215 selects one cutting position from a plurality of cutting position candidates calculated by the cutting position calculation unit 213.

The cutting position calculation unit 213 first calculates a cutting depth d [mm] designated by a canned cycle command as a candidate for a cutting depth of the first cutting operation in the canned cycle. In addition, the cutting position calculation unit 213 calculates a remainder dm=MOD(h/d) [mm] obtained by dividing a total cutting depth in the canned cycle by the cutting depth d designated by the canned cycle command as a candidate for the cutting depth in the first cutting operation in the canned cycle. Here, h is the total cutting depth of cutting in the cutting operation in the canned cycle. In addition, MOD(h/d) is a remainder of (h/d). That is, the cutting position calculation unit 213 calculates d and dm as candidates for the cutting depth of the first cutting operation in the canned cycle.

Next, the cutting position calculation unit 213 calculates two cutting positions corresponding to two calculated candidates for the cutting depth, respectively.

FIGS. 4A and 4B are diagrams each for describing an example of the cutting position calculated by the cutting position calculation unit 213 when outer diameter turning is performed using the canned cycle for roughing. As described above, when the cutting depth d is designated in the canned cycle command, the candidates for the cutting depth in the first cutting operation in the canned cycle are d and dm. Therefore, the cutting position calculation unit 213 calculates two cutting positions corresponding to the calculated candidates d and dm for the cutting depth, respectively.

The cutting position calculation unit 213 calculates a cutting position Ps1(Xs1, Zs1) corresponding to the cutting depth d (FIG. 4A). Here, Xs1=Xs0−d, Zs1=Zs0, and Xs0 and Zs0 are coordinate values of an X-coordinate and a Z-coordinate of a start point St of the canned cycle, respectively. In addition, the cutting position calculation unit 213 calculates a cutting position Pt1(Xt1, Zt1) corresponding to the cutting depth dm (FIG. 4B). Here, Xt1=Xt0−dm and Zt1=Zt0.

In addition, the cutting position calculation unit 213 calculates cutting positions for performing second and subsequent cutting operations.

The cutting position calculation unit 213 calculates PsN (XsN, ZsN) as a cutting position in an Nth cutting operation after the first cutting operation corresponding to the cutting position Ps1. Here, XsN=Xs1−d×(N−1) (where N is an integer of 2 or more), and ZsN=Zs0. In addition, the cutting position calculation unit 213 calculates PsH(XsH, ZsH) as a cutting position in a last cutting operation. Here, XsH is a coordinate value of an X-axis coordinate indicating the cutting position of the last cutting operation, and ZsH=Zs0. In addition, a cutting depth in the last cutting operation is dm.

The cutting position calculation unit 213 calculates PtN (XtN, ZtN) as a cutting position in the Nth cutting operation after the first cutting operation corresponding to the cutting position Pt1. Here, XtN=Xt1−d×(N−1), and Zt2=Zt0. In addition, the cutting position calculation unit 213 calculates PtH(XtH, ZtH) as a cutting position in the last cutting operation. Here, XtH is a coordinate value of an X-axis coordinate indicating the cutting position of the last cutting operation, and ZtH=Zt0.

The control information calculation unit 214 calculates a plurality of pieces of control information corresponding to the plurality of cutting positions calculated by the cutting position calculation unit 213, respectively. When the cutting position calculation unit 213 calculates two cutting positions Ps1 and Pt1 as candidates for the cutting position in the first cutting operation, control information corresponding to each of the cutting position candidates is calculated. The control information includes, for example, feed rate information.

The control information calculation unit 214 calculates, for example, feed rate information at each of the cutting positions Ps1 and Pt1 when feed per rotation control and constant surface speed control are executed.

The constant surface speed control refers to control for keeping a cutting speed of the workpiece constant. For example, the surface speed is designated as V=50 [m/min], and a control operation is performed so that a speed of the spindle becomes about 100 [rpm] when a position of a radius 80 [mm] is machined. In addition, the surface speed is designated as V=50 [m/min], and a control operation is performed so that a speed of the spindle becomes about 88 [rpm] when a position of a radius 90 [mm] is machined. That is, under the constant surface speed control, as a distance from a rotation center of the spindle to a cutting location decreases, the rotational speed of the spindle increases.

Feed per rotation control is to control the feed rate by a distance traveled during one rotation of the spindle. For example, when a feed rate per rotation f=0.2 [mm/rev], the tool advances by 0.2 [mm] while the spindle rotates once.

Under feed per rotation control and constant surface speed control, a feed rate F [mm/min] differs depending on the distance from the rotation center of the spindle to the cutting location. For example, when a position of a radius 80 [mm] is machined along a Z-axis at a surface speed V=50 [m/min] and a feed rate per rotation f=0.2 [mm/rev], a feed rate is F=20 [mm/min]. On the other hand, when a position of a radius 90 [mm] is machined along the Z-axis at a surface speed V=50 [m/min] and a feed rate per rotation f=0.2 [mm/rev], a feed rate is F=18 [mm/min]. Note that when feed per rotation control and constant surface speed control are performed, a feed rate is obtained by $F=fV/(2\pi P)$ [mm/min]. Here, P denotes a coordinate value of an X-coordinate of the cutting position.

The selection unit 215 selects one cutting position from a plurality of cutting positions based on the plurality of pieces of control information calculated by the control information calculation unit 214. For example, when the control information is feed rate information, the selection unit 215 selects one cutting position corresponding to one piece of feed rate information indicating a higher feed rate from a plurality of pieces of feed rate information. In other words, the selection unit 215 selects a cutting position at which the feed rate becomes higher from the plurality of cutting positions calculated by the cutting position calculation unit 213 as a first cutting position when the canned cycle is executed. Under feed per rotation control and constant surface speed control, the cutting position at which the feed rate becomes higher is a cutting position closer to the rotation center of the spindle. Therefore, in the examples illustrated in FIGS. 4A and 4B, the selection unit 215 selects Ps1 as a cutting position for the first cutting operation.

The command generation unit 216 generates a control command for performing a cutting operation at the cutting position selected by the selection unit 215. In addition, the command generation unit 216 generates a control command for performing a cutting operation subsequent to the cutting operation at the cutting position selected by the selection unit 215. For example, when Ps1 illustrated in FIG. 4A is selected as the cutting position for the first cutting operation, the command generation unit 216 generates a control command for cutting at the cutting positions PsN and PsH. In addition, the command generation unit 216 generates a control command corresponding to a command other than the canned cycle command included in the machining program decoded by the program decoding unit 212.

Figures 5B, 5C, 6A:
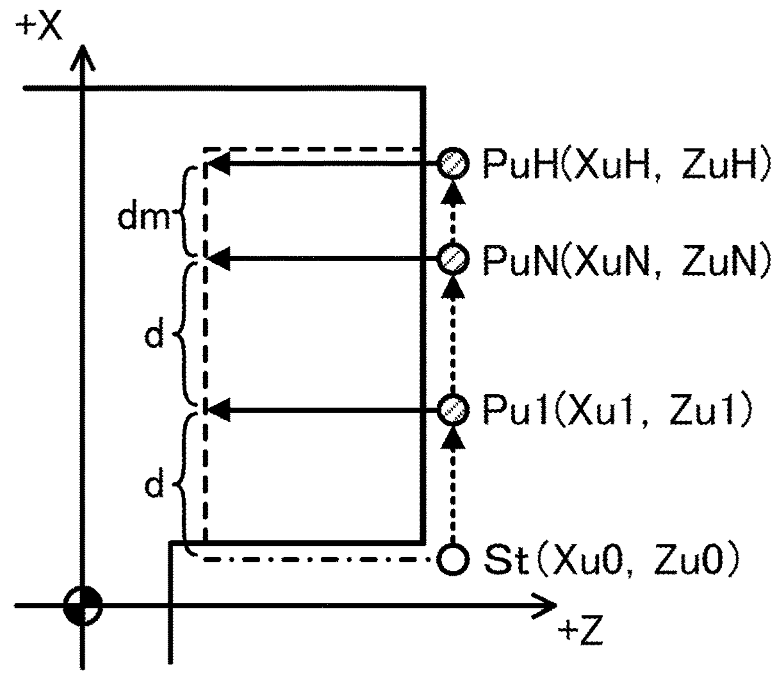
FIG. 5B is a diagram for describing a control command generated by the command generation unit.
FIG. 5C is a diagram for describing a control command generated by the command generation unit.
FIG. 6A is a diagram for describing an example of candidates for a cutting position calculated by the cutting position calculation unit.

Each of FIGS. 5A to 5C is a diagram for describing a control command generated by the command generation unit 216 when the machining program illustrated in FIG. 3 is executed.

The command generation unit 216 first generates a control command for designating the first cutting operation (FIG. 5A). That is, the command generation unit 216 generates a control command for the tool to be first positioned at Ps1(80.0, 0.0), then perform machining in a negative direction of the Z-axis, then perform a retract operation in a positive direction of an X-axis and a positive direction of the Z-axis, then move in the positive direction of the Z-axis, and finally return to a start position of the cutting operation.

Next, the command generation unit 216 generates a control command for designating the second cutting operation (FIG. 5B). That is, the command generation unit 216 generates a control command for the tool to be positioned at Ps2(60.0, 0.0), then perform cutting in the negative direction of the Z-axis, then perform a retract operation in the positive direction of the X-axis and the positive direction of the Z-axis, then move in the positive direction of the Z-axis, and finally return to a start position of the cutting operation.

Finally, the command generation unit 216 generates a control command for designating the last cutting operation (FIG. 5C). That is, the command generation unit 216 generates a control command for the tool to be positioned at PsH(50.0, 0.0), then perform cutting in the negative direction of the Z-axis, then perform a retract operation in the positive direction of the X-axis and the positive direction of the Z-axis, then move in the positive direction of the X-axis to a height (Xs0) of a start point, and finally return to a start point St in the positive direction of the Z-axis.

The control unit 217 controls operations of the spindle and each axis of the machine tool 1 based on control commands generated by the command generation unit 216. In this way, the workpiece is machined in the machine tool 1.

Figure 6B:
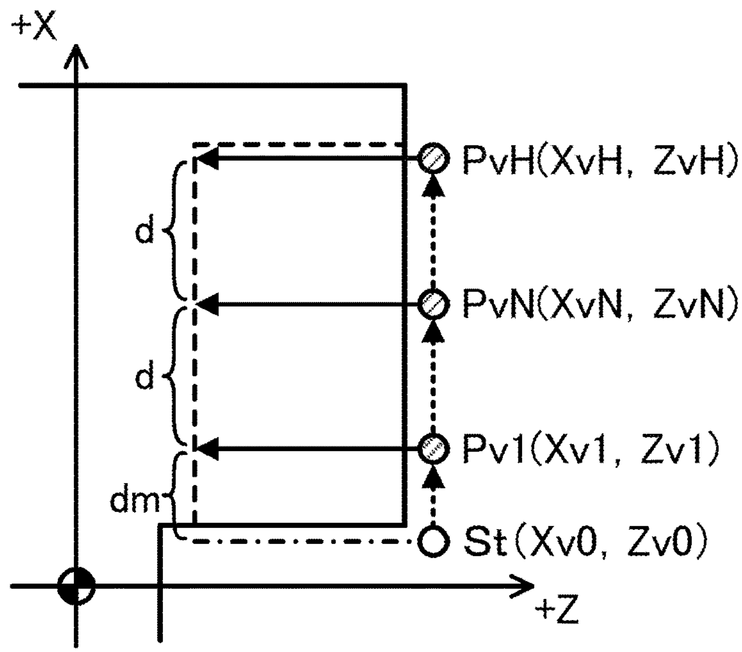
FIG. 6B is a diagram for describing an example of candidates for a cutting position calculated by the cutting position calculation unit.

FIGS. 6A and 6B are diagrams each for describing an example of two candidates for the cutting position calculated by the cutting position calculation unit 213 when inner diameter turning is performed using a canned cycle for roughing. When the cutting depth d is designated in a canned cycle command, candidates for the cutting depth in the first cutting operation in the canned cycle are d [mm] and dm=MOD(h/d) [mm]. Therefore, the cutting position calculation unit 213 calculates a plurality of cutting positions corresponding to the calculated candidates d and dm for the cutting depth, respectively.

The cutting position calculation unit 213 calculates a cutting position Pu1(Xu1, Zu1) corresponding to the cutting depth d (FIG. 6A). Here, Xu1=Xu0+d, Zu1=Zu0, and Xu0 and Zu0 are coordinate values of the X-coordinate and Z-coordinate of the start point St of the canned cycle, respectively. In addition, the cutting position calculation unit 213 calculates a cutting position Pv1(Xv1, Zv1) corresponding to the cutting depth dm (FIG. 6B). Here, Xv1=Xv0+dm and Zv1=Zv0.

In addition, the cutting position calculation unit 213 calculates cutting positions for performing the second and subsequent cutting operations.

The cutting position calculation unit 213 calculates PuN (XuN, ZuN) as a cutting position in the Nth cutting operation after the first cutting operation corresponding to the cutting position Pu1. Here, XuN=Xu1+d×(N−1), and ZuN=Zu0. In addition, the cutting position calculation unit 213 calculates PuH(XuH, ZuH) as the cutting position in the last cutting operation. Here, XuH is a coordinate value of the X-axis coordinate indicating the cutting position in the last cutting operation, and ZuH=Zu0. In addition, a cutting depth in the last cutting operation is dm.

The cutting position calculation unit 213 calculates PvN (XvN, ZvN) as a cutting position in the Nth cutting operation after the first cutting operation corresponding to the cutting position Pv1. Here, XvN=Xv1+d×(N−1), and ZvN=Zv0. In addition, the cutting position calculation unit 213 calculates PvH(XvH, ZvH) as the cutting position in the last cutting operation. Here, XvH is a coordinate value of the X-axis coordinate indicating the cutting position in the last cutting operation, and ZvH=Zv0.

The control information calculation unit 214 calculates a plurality of pieces of control information corresponding to the plurality of cutting positions calculated by the cutting position calculation unit 213, respectively. When the cutting position calculation unit 213 calculates two cutting positions Pu1 and Pv1 as candidates for the cutting position in the first cutting operation, control information corresponding to each of these candidates for the cutting position is calculated. The control information includes, for example, feed rate information.

For example, the control information calculation unit 214 calculates the feed rate information at each of the cutting positions Pu1 and Pv1 when feed per rotation control and constant surface speed control are executed.

The selection unit 215 selects one cutting position from a plurality of cutting positions based on the plurality of pieces of control information calculated by the control information calculation unit 214. For example, when the control information is feed rate information, the selection unit 215 selects one cutting position corresponding to one piece of feed rate information indicating a higher feed rate from two pieces of feed rate information. That is, the selection unit 215 selects a cutting position at which a feed rate is higher from the plurality of cutting positions calculated by the cutting position calculation unit 213 as a first cutting position when the canned cycle is executed.

Under feed per rotation control and constant surface speed control, the cutting position at which the feed rate is higher is a cutting position closer to the rotation center of the spindle. Therefore, in the examples illustrated in FIGS. 6A and 6B, the selection unit 215 selects Pv1 as the cutting position for the first cutting operation.

The command generation unit 216 generates a control command for performing a cutting operation at the cutting position selected by the selection unit 215. In addition, the command generation unit 216 generates a control command for performing a cutting operation subsequent to the cutting operation at the cutting position selected by the selection unit 215. That is, when Pv1 illustrated in FIG. 6B is selected as the cutting position for the first cutting operation, command generation unit 216 generates a control command for cutting at cutting positions PvN and PvH. Furthermore, the command generation unit 216 generates a control command corresponding to a command other than the canned cycle command included in the machining program decoded by the program decoding unit 212.

The control unit 217 controls the operations of the spindle and each axis of the machine tool 1 based on the control commands generated by the command generation unit 216. In this way, the workpiece is machined in the machine tool 1.

When the cutting depth in the first cutting operation is d, the control unit 217 executes a cutting operation in which the cutting depth is set to dm at the end of the canned cycle. Further, when the cutting depth in the first cutting operation is dm, the control unit 217 executes a cutting operation in which the cutting depth is set to d at the end of the canned cycle. That is, the selection unit 215 selects whether the cutting operation with the cutting depth dm is executed first or last, and the control unit 217 controls the cutting operation based thereon.

Next, a flow of processing executed by the numerical controller 2 will be described.

Figure 7:
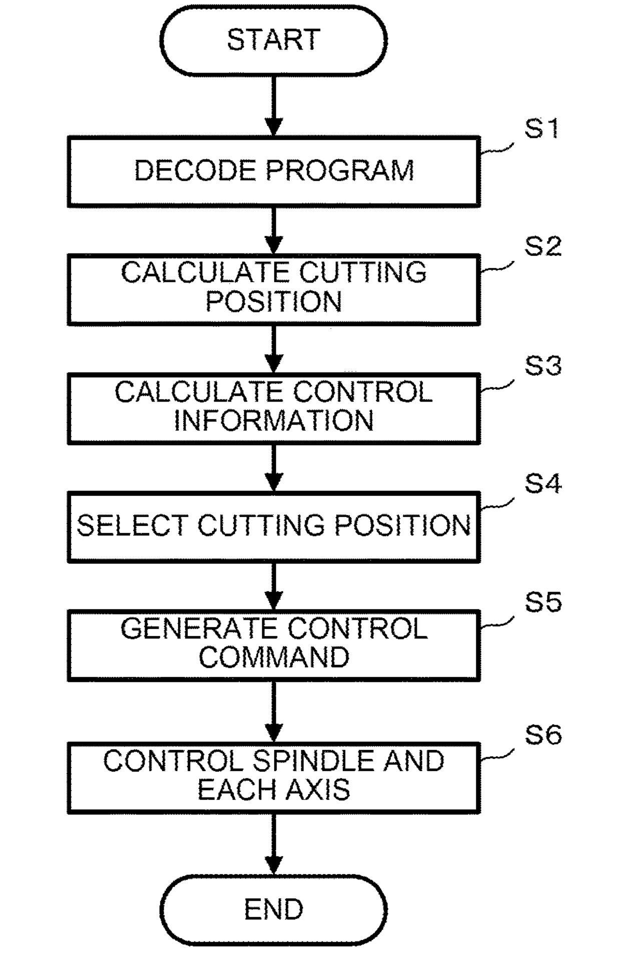
FIG. 7 is a flowchart illustrating an example of a flow of processing executed by the numerical controller.

FIG. 7 is a flowchart illustrating an example of the flow of the processing executed by the numerical controller 2.

In the numerical controller 2, first, the program decoding unit 212 reads the machining program stored in the program storage unit 211 and decodes the read machining program (step S1).

Next, the cutting position calculation unit 213 calculates candidates for the cutting position in the canned cycle based on a decoding result of the machining program decoded by the program decoding unit 212 (step S2).

Next, the control information calculation unit 214 calculates control information corresponding to the candidates for the cutting position calculated by the cutting position calculation unit 213 (step S3). The control information calculated by the control information calculation unit 214 is, for example, feed rate information.

Next, the selection unit 215 selects one cutting position from a plurality of cutting position candidates based on the control information calculated by the control information calculation unit 214 (step S4).

Next, the command generation unit 216 generates a control command for performing a cutting operation at the cutting position selected by the selection unit 215 (step S5).

Finally, the control unit 217 controls the spindle and each axis of the machine tool 1 based on the control commands generated by the command generation unit 216 (step S6), and the process ends.

As described above, the numerical controller 2 includes the cutting position calculation unit 213 that calculates a plurality of cutting positions during execution of the canned cycle based on code designating the cutting depth included in the canned cycle command, the control information calculation unit 214 that calculates a plurality of pieces of control information corresponding to the plurality of cutting positions calculated by the cutting position calculation unit 213, respectively, and the selection unit 215 that selects one cutting position from a plurality of cutting positions based on the plurality of pieces of control information calculated by the control information calculation unit 214. Therefore, the numerical controller 2 can shorten the execution time of the machining program including the canned cycle.

In addition, the plurality of pieces of control information includes a plurality of pieces of feed rate information. In this case, the selection unit 215 selects one cutting position corresponding to one piece of feed rate information indicating a highest feed rate from the plurality of pieces of feed rate information. Therefore, the numerical controller 2 can perform cutting at a cutting position at which a feed rate is higher during execution of the canned cycle.

In addition, the control information calculation unit 214 calculates a plurality of pieces of feed rate information when feed per rotation control and constant surface speed control are executed. In this way, cutting can be performed at a cutting position where the feed rate is highest under feed per rotation control and constant surface speed control.

Further, in the above-described embodiment, the cutting position PsN is closer to the rotation center of the spindle than the cutting position PtN (see FIGS. 4A and 4B). Therefore, the numerical controller 2 can position the tool at a cutting position where the feed rate is higher in each cutting operation.

In the above-described embodiment, a plurality of pieces of feed rate information is illustrated as a plurality of pieces of control information. However, the plurality of pieces of control information is not limited to the plurality of pieces of feed rate information. The plurality of pieces of control information may be, for example, a plurality of pieces of distance information indicating respective distances between the plurality of cutting positions and the center of the spindle.

For example, in the examples illustrated in FIGS. 4A and 4B, the control information calculation unit 214 calculates a distance between Ps1 and the rotation center of the spindle, that is, a coordinate value of the X-coordinate of Ps1 as control information. In addition, the control information calculation unit 214 calculates a distance between Pt' and the rotation center of the spindle, that is, a coordinate value of the X-coordinate of Pt' as control information. In this case, the selection unit 215 selects one cutting position corresponding to one piece of distance information indicating the shortest distance from a plurality of pieces of distance information calculated as the control information. That is, the selection unit 215 selects Ps1. Therefore, the numerical controller 2 can perform machining at a cutting position where the feed rate is higher during execution of the canned cycle.

In addition, for example, the plurality of pieces of control information may be a plurality of pieces of rotational speed information of a spindle. For example, in the examples illustrated in FIGS. 4A and 4B, the control information calculation unit 214 calculates a rotational speed of a spindle at Ps1 and a rotational speed of the spindle at Pt' as the control information. In this case, the selection unit 215 selects one cutting position corresponding to one piece of rotational speed information of the spindle indicating a highest speed from the plurality of pieces of rotational speed information calculated as the control information. That is, the selection unit 215 selects Ps1. Therefore, the numerical controller 2 can perform machining at a cutting position where the feed rate is higher during execution of the canned cycle.

In the above-described embodiment, a description has been given of a configuration in which the cutting position calculation unit 213 calculates two cutting position candidates in the first cutting operation. However, the cutting position calculation unit 213 may calculate a cutting position each time cutting is performed once in the canned cycle.

Hereinafter, a description will be given of an embodiment in which the cutting position calculation unit 213 calculates a cutting position each time cutting is performed once in the canned cycle. Note that description of the same configuration as that of the above-described embodiment will be omitted.

FIG. 8 is a diagram illustrating an example of the machining program used for inner diameter turning. When the canned cycle of the machining program illustrated in FIG. 8 is executed, the cutting position calculation unit 213 calculates a cutting position each time the cutting operation in the canned cycle is executed once.

FIG. 9 is a diagram for describing a first cutting operation during execution of a canned cycle used for inner diameter turning. FIG. 10 is a diagram for describing the Nth cutting operation after the first cutting operation during execution of the canned cycle used for inner diameter turning.

The cutting position calculation unit 213 calculates a plurality of cutting positions in a range of dmin or more and dmax or less in the first cutting operation.

dmin is a minimum cutting depth in one cutting operation. dmin is, for example, a remainder dm=MOD(h/d) obtained by dividing a total cutting depth h in the canned cycle by a cutting depth d designated by the canned cycle command. When the machining program illustrated in FIG. 8 is executed, dmin is 10 [mm].

dmax is a maximum cutting depth in one cutting operation. dmax is, for example, a cutting depth d designated by the canned cycle command. When the machining program illustrated in FIG. 8 is executed, dmax is 20 [mm].

The cutting position calculation unit 213 calculates, for example, a position of dmin, a position of dmax, and a position obtained by equally dividing a distance between the position of dmin and the position of dmax as cutting positions. FIG. 9 illustrates an example in which the cutting position calculation unit 213 calculates a position $P_{11}$ of dmin, a position $P_{13}$ of dmax, and a position $P_{12}$ obtained by dividing a distance between dmin and dmax into two equal parts as cutting positions, in the first cutting operation.

When the total number of times of cutting S in the canned cycle is set, the cutting position calculation unit 213 may adjust the value of dmin so that the number of times of cutting in the canned cycle does not exceed the set total number of times of cutting S. For example, the total number of times of cutting S is set to S=1+QUOTIENT(h/d). Here, QUOTIENT(h/d) is a quotient of (h/d).

Whether or not the number of times of cutting in the canned cycle exceeds the set total number of times of cutting S is determined, for example, based on whether or not a conditional expression: $P_0(x)$+dmin+the remaining number of times of cutting×dmax≥H(X) is satisfied in the first cutting operation. Here, $P_0(x)$ denotes a coordinate value indicating the X-coordinate of the start point of the canned cycle, the remaining number of times of cutting refers to the number of times of cutting from the second cutting operation to the last cutting operation, and H(X) denotes a coordinate value indicating the X-coordinate of the cutting position in the last cutting operation. When this conditional expression is satisfied in the first cutting operation, dmin is not adjusted.

For example, when the machining program illustrated in FIG. 8 is executed, $P_0(X)$=20.0, dmin=10.0, the remaining number of times of cutting=2, dmax=20.0, and H(X)=70.0. Therefore, $P_0(x)$+dmin+the remaining number of times of cutting×dmax=20.0+10.0+2×20.0=70≥H(X)=70.0 is satisfied. Therefore, dmin is not adjusted.

The control information calculation unit 214 calculates a plurality of pieces of control information corresponding to a plurality of cutting positions $P_{11}$, $P_{12}$, and $P_{13}$ calculated by the cutting position calculation unit 213, respectively. When the cutting position calculation unit 213 calculates candidates for three cutting position $P_{11}$, $P_{12}$, and $P_{13}$ as cutting position candidates in the first cutting operation, the control information calculation unit 214 calculates control information corresponding to each of these cutting position candidates. The control information includes, for example, feed rate information.

The control information calculation unit 214 calculates, for example, the feed rate information at the cutting positions $P_{11}$, $P_{12}$, and $P_{13}$ when feed per rotation control and constant surface speed control are executed. Note that when machining is performed under feed per rotation control and constant surface speed control, a feed rate F1 at the cutting position $P_{11}$ is the highest, the feed rate decreases in order of a feed rate F2 at the cutting position $P_{12}$ and a feed rate at the cutting position $P_{13}$.

The selection unit 215 selects one cutting position from a plurality of cutting positions based on the plurality of pieces of control information calculated by the control information calculation unit 214. When the control information calculation unit 214 calculates a plurality of pieces of feed rate information F1, F2, and F3, the selection unit 215 selects one cutting position corresponding to one piece of feed rate information indicating the highest feed rate from the plurality of pieces of feed rate information F1, F2, and F3.

Under feed per rotation control and constant surface speed control, the cutting position at which the feed rate becomes higher is the cutting position closest to the rotation center of the spindle. Therefore, in the example illustrated in FIG. 9, the selection unit 215 selects $P_{11}$ as a cutting position for the first cutting operation.

In addition, the cutting position calculation unit 213 calculates the cutting position in the Nth cutting operation after the first cutting operation. The cutting position calculation unit 213 calculates a plurality of cutting positions in a range of dmin or more and dmax or less. When the total number of times of cutting S in the canned cycle is set, the cutting position calculation unit 213 determines whether or not dmin needs to be adjusted so that the number of times of cutting in the canned cycle does not exceed the set total number of times of cutting S.

Whether or not the number of times of cutting in the canned cycle exceeds the total number of times of cutting is determined based on whether or not $P_{N-1}(x)$+dmin+the remaining number of times of cutting×dmax≥H(X) is satisfied in the Nth cutting operation. Here, $P_{N-1}(X)$ denotes a coordinate value indicating an X-coordinate of an (N−1)th cutting position of the canned cycle.

In the canned cycle of the machining program illustrated in FIG. 8, for example, when the second cutting operation is executed, $P_1(X)=30.0$, dmin=10.0, the remaining number of times of cutting=1, dmax=20.0, and H(X)=70.0. Therefore, $P_1(X)$+dmin+the remaining number of times of cutting× dmax=30.0+10.0+1×20.0=60<H(X)=70.0, and the above conditional expression is not satisfied. Therefore, dmin is adjusted. That is, when cutting is performed with the cutting depth dmin in the Nth cutting operation, in the case where the set total number of times of cutting is exceeded even when cutting is performed with dmax in the remaining cutting operation, dmin is adjusted in the Nth cutting operation.

dmin is adjusted to $H(X)-(P_1(X)$+(the remaining number of times of cutting)×dmax). That is, dmin is changed to dmin=100−(60+1×20)=20. Therefore, dmin=dmax, and the cutting position calculation unit 213 calculates a position $P_2$ that is cut by 20 [mm] from $P_1$ as a cutting position.

Since one cutting position is calculated by the cutting position calculation unit 213, the control information calculation unit 214 calculates feed rate information at the cutting position $P_2$. In addition, the selection unit 215 selects the cutting position $P_2$. In this way, the Nth cutting operation after the first cutting operation in the canned cycle is executed. In addition, in the last cutting operation in the canned cycle, dmin is not adjusted. Therefore, when the machining program illustrated in FIG. 8 is executed, dmin is not adjusted in the third cutting operation in the canned cycle.

In the above-described embodiment, dmin is set to dm=MOD(h/d). However, dmin is not limited thereto. For example, dmin may be a value preset by a parameter. Further, in the above-described embodiment, a description has been given of an example in which the position obtained by dividing the distance between dmin and dmax into two equal parts is calculated as the cutting position. However, positions obtained by dividing the distance into three or more equal parts may be calculated as cutting positions, respectively. Alternatively, the cutting position may be calculated for each predetermined interval I between dmin and dmax.

EXPLANATIONS OF LETTERS OR NUMERALS

1 MACHINE TOOL
2 NUMERICAL CONTROLLER
201 CPU
202 BUS
203 ROM
204 RAM
205 NONVOLATILE MEMORY
206 INTERFACE
207 AXIS CONTROL CIRCUIT
208 SPINDLE CONTROL CIRCUIT
209 PLC
210 I/O UNIT
211 PROGRAM STORAGE UNIT
212 PROGRAM DECODING UNIT
213 CUTTING POSITION CALCULATION UNIT
214 CONTROL INFORMATION CALCULATION UNIT
215 SELECTION UNIT
216 COMMAND GENERATION UNIT
217 CONTROL UNIT
3 INPUT/OUTPUT DEVICE
4 SERVO AMPLIFIER
5 SERVOMOTOR
6 SPINDLE AMPLIFIER
61 AMMETER
7 SPINDLE MOTOR
8 AUXILIARY EQUIPMENT

The invention claimed is:

1. A numerical controller comprising:
a processor configured to:
calculate a plurality of cutting positions during execution of a canned cycle based on code for designating a cutting depth included in the canned cycle command;
calculate a plurality of pieces of control information corresponding to the calculated plurality of cutting positions;
wherein the plurality of pieces of control information includes a plurality of pieces of feed rate information; and
select one cutting position from the plurality of cutting positions based on the calculated plurality of pieces of control information.

2. The numerical controller according to claim 1, wherein the selection unit processor selects the one cutting position corresponding to one piece of feed rate information indicating a highest feed rate from the plurality of pieces of feed rate information.

3. The numerical controller according to claim 1, wherein the control information calculation unit processor calculates the plurality of pieces of feed rate information when feed per rotation control and constant surface speed control are executed.

4. The numerical controller according to claim 1, wherein the plurality of pieces of control information further includes a plurality of pieces of distance information indicating distances between the plurality of cutting positions and a rotation center of a spindle, respectively.

5. The numerical controller according to claim 4, wherein the processor selects the one cutting position corresponding to one piece of distance information indicating a shortest distance from the plurality of pieces of distance information.

6. The numerical controller according to claim 1, wherein the plurality of pieces of control information further includes a plurality of pieces of rotational speed information of a spindle.

7. The numerical controller according to claim 6, wherein the processor selects the one cutting position corresponding to one piece of rotational speed information of the spindle indicating a highest speed from the plurality of pieces of rotational speed information of the spindle.

* * * * *